United States Patent [19]

Brookman

[11] Patent Number: 4,482,210
[45] Date of Patent: Nov. 13, 1984

[54] SAFETY MIRROR

[76] Inventor: Larry W. Brookman, 1380 Farrington Rd., Philadelphia, Pa. 19151

[21] Appl. No.: 468,132

[22] Filed: Feb. 22, 1983

Related U.S. Application Data

[63] Continuation-in-part of Ser. No. 429,244, Sep. 30, 1982.

[51] Int. Cl.³ .............................................. G02B 5/08
[52] U.S. Cl. ...................................... 350/631; 356/21
[58] Field of Search ........................... 350/288; 356/21

[56] References Cited

U.S. PATENT DOCUMENTS

| | | | |
|---|---|---|---|
| 1,311,253 | 7/1919 | Stern | 356/21 |
| 1,879,592 | 9/1932 | Thomas | 350/288 |
| 2,514,989 | 7/1950 | Buren | 350/303 X |
| 2,871,754 | 2/1959 | Marble | 356/21 X |
| 2,881,655 | 4/1959 | Eisenschink | 356/21 |
| 3,521,234 | 7/1970 | Darin | 356/21 X |
| 3,772,795 | 11/1973 | Calvet | 33/264 |
| 3,859,732 | 1/1975 | Davin | 33/264 |
| 4,311,362 | 1/1982 | LaPorte | 350/293 |

Primary Examiner—John K. Corbin
Assistant Examiner—Lynn Vandenburgh
Attorney, Agent, or Firm—Karl L. Spivak

[57] ABSTRACT

An automobile safety mirror is disclosed which is fabricated of laminated safety glass construction. Front and rear glass panels sandwich a layer of colored plastic therebetween and a suitable mirror surface is applied to the rear of the rear glass panel. The plastic layer is divided into red and yellow colored zones by a line of demarcation to delineate safe and non-safe passing conditions. A guide consisting of intersecting horizontal and vertical guide lines is provided in the yellow colored zone in spaced relation from the line of demarcation to facilitate initial aligning or aiming of the safety mirror.

8 Claims, 8 Drawing Figures

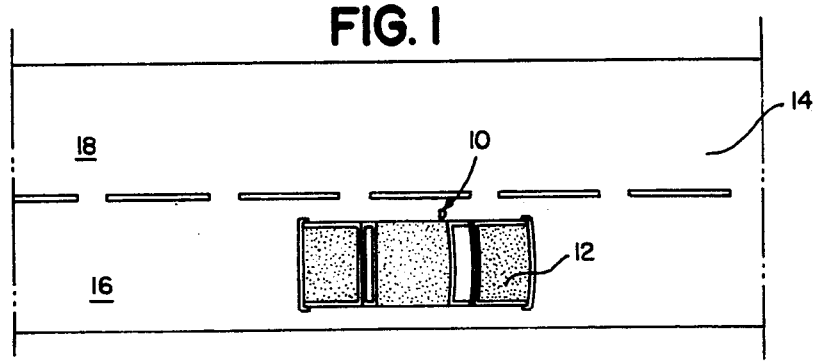
FIG. 1
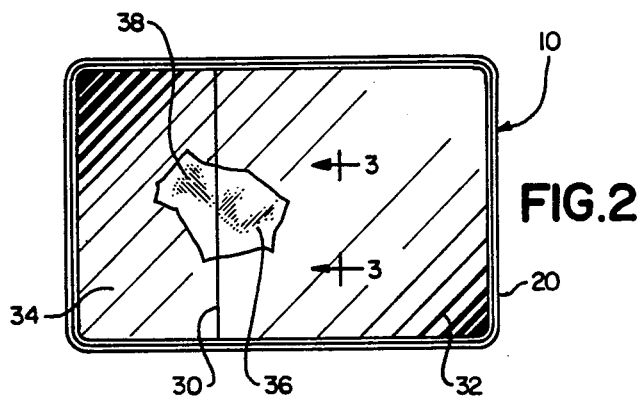
FIG. 2
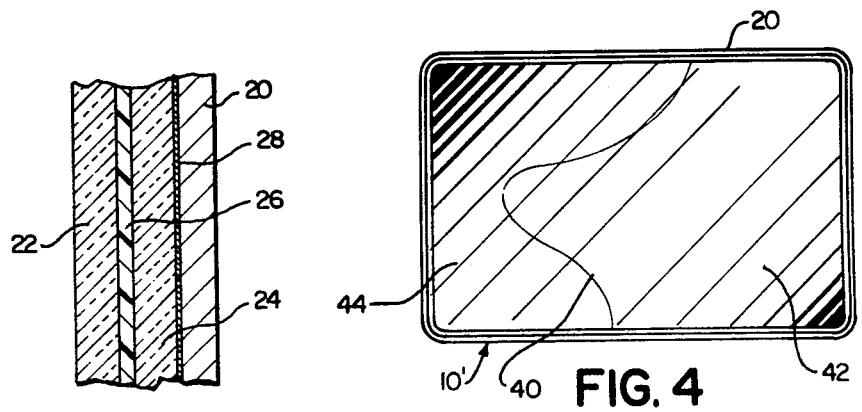
FIG. 3
FIG. 4

SAFETY MIRROR

RELATED APPLICATION

This application is a continuation-in-part of my co-pending application Ser. No. 429,244 filed Sept. 30, 1982, and entitled "Vehicle Safety Mirror".

BACKGROUND OF THE INVENTION

The present invention relates generally to the field of side view mirrors for motor vehicles, and more particularly, is directed to an improved side view mirror that is especially designed to facilitate rapid determination of a safe passing distance in front of an overtaking vehicle.

When driving upon the highways, it is frequently necessary to overtake and pass a slower moving vehicle which is traveling in the same direction. In order to make sure that the slower vehicle can be passed in safety, the driver must quickly and accurately determine whether the distance between the slower vehicle and oncoming traffic is sufficient to safely permit the passing maneuver and at substantially the same time, the driver must also make a determination whether or not there is also sufficient rearward clearance from overtaking vehicles traveling in the same direction to permit safe passing.

With the development of high-speed vehicular traffic and crowded highways, it is of great importance that the driver be able to quickly determine whether the road conditions, both forwardly and rearwardly, are safe for passing purposes. While oncoming traffic is usually readily visible through the windshield of the automobile by means of a simple forward observation, such easy visual surveillance is not possible with regard to rearwardly positioned traffic unless the driver were to turn his head completely about approximately one hundred and eighty degrees to directly view to the rear. Of course, such turning of the head is extremely dangerous and is frowned upon by all recognized highway safety personnel.

In order to quickly and comprehensively observe rearwardly positioned traffic without creating an undue hazard caused by the driver turning his head, most vehicles are equipped with both a rear view mirror and side view mirror, which mirrors are so installed and positioned in and about the vehicle as to permit the driver to observe rearward traffic conditions by merely shifting his eyes to view the mirrors without completely turning his head. The side view mirror is most advantageous to determine whether the passing lane is sufficiently clear from the rear to allow the motorist to pull into the passing lane for passing a slower moving vehicle in front.

In view of the relatively high speed of travel which is usual on most highways, there is only a very limited period within which the driver has time to observe and to determine whether or not the passing lane is clear enough so that he can safely pass a forwardly positioned, slower moving vehicle. The inability of drivers to quickly and correctly observe the road conditions and to respond accordingly to execute the passing maneuver has developed into a major cause of many highway accidents.

It is of utmost importance that the driver maintain visual observation of the vehicle to be overtaken during the execution of the passing procedures, and to also observe the rearward clearance available in the left or passing lane before entering that passing lane for forwardly positioned vehicle passing purposes. Thus, at the very moment of passing when the passing driver's attention should be almost totally concentrated on the leading vehicle, his attention must somehow simultaneously be diverted to determine the road conditions rearwardly in the passing lane, thereby creating a safety hazard at the very moment of greatest exposure.

In the presently available side view mirrors, there is no easy manner in which to gauge distances to the rear, especially when time for only a fleeting glimpse is usually available because of the highway safety considerations. In view of the lack of an easy method of gauging rearward distances, it sometimes requires excessive motorist concentration in the side view mirror and in the rear view mirror to determine exactly the position of an overtaking vehicle prior to execution of the forward passing procedure. This protracted time further increases the danger to all vehicles and motorists in and about the location of the passing procedure. Additionally, there is a considerable glare during nighttime driving from automobile headlamps of trailing vehicles, and this glare is frequently reflected directly into the eyes of the driver because of the angular orientation of the present side view and rear view mirrors which must be positioned to enable a driver to quickly and conveniently sight rearwardly.

In the said co-pending application Ser. No. 429,244, the applicant has disclosed a vehicle safety mirror having a line of demarcation between "safe" and "unsafe" passing zones to enable a driver to quickly and easily determine whether or not there is sufficient clearance between his vehicle and an overtaking vehicle to allow safe movement of his vehicle into the passing lane for passing a forwardly located vehicle.

SUMMARY OF THE INVENTION

The present invention relates generally to the field of automobile side view mirrors, and more particularly, is directed to a vehicle side view mirror including easily read "safe" and "non-safe" zones whereby, by observing rearwardly positioned traffic in the side view mirror, a driver can speedily and accurately determine whether adequate clearance is available to him for passing purposes.

The improved safety mirror of the present invention includes a line of demarcation upon the face of the mirror which is so positioned as to delineate the safe passing zone from the danger zone. As soon as any part of a trailing vehicle appears in the danger zone, the driver will immediately know that there is insufficient clearance between his vehicle and the rearwardly positioned vehicle and therefore, that it is unsafe to attempt to pass a slower moving, forwardly positioned vehicle.

The improved safety mirror of the present invention is fabricated of safety glass construction and includes a laminated sandwich-like construction having top and bottom glass layers with a suitable plastic laminate intermediate the top and bottom glass layers. The glass layers and the intermediate plastic sheet are bound together in known manner to provide a suitable safety glass construction.

In the preferred embodiment of the improved safety mirror, the portion of the plastic sheet which lies within the so-called "safe" or passing area is fabricated of yellow or amber colored plastic so that the driver, when his quick glance observes a rearwardly positioned automobile in the yellow area, will automatically and quickly determine that the rearwardly positioned vehicle is at a nominally safe distance behind to allow him to enter into the passing lane. A green tint has not been chosen because some drivers may interpret this color to mean absolute safety, which may not always be the case when considering such variables as speed, highway conditions, weather and the like.

Similarly, the "unsafe" or no-passing portion of the safety mirror is preferably fabricated of red plastic, whereby an image in the "no-passing" portion of the mirror will appear red to the view. Accordingly, as soon as any portion of the image of an overtaking vehicle is viewed by the driver to the left of the demarcation line, that is, within the red colored area, the driver will immediately know that it would be unsafe for him to attempt to pass any forwardly positioned vehicles. It is noteworthy that the red color is the standard highway and traffic symbol which is universally employed to indicate stop or danger, much in the manner of the usual traffic light colors employed generally throughout most areas of the world. The amber or yellow color has been chosen as a standard recognized symbol which is generally or universally employed to indicate caution. Accordingly, should any portion of an overtaking vehicle appear in the improved safety mirror in the red or "danger" zone, then the driver can rapidly determine at a glance that it is unsafe to pass. Should the entire image of the overtaking vehicle appear in the yellow area, this would then quickly indicate that the driver could pass with caution. The determinations of "safe" or "non-safe" passing distances can be quickly made by the driver at a glance, thereby not in any manner detracting the driver's concentration from the vehicle in front.

The optimum position of the line of demarcation has been determined to be approximately two thirds of the width of the mirror away from the driver's side of the vehicle. In this location, a vehicle viewed in the yellow or "caution" area indicates a distance of approximately two or two and one-half car lengths between the vehicle being driven and an overtaking vehicle. Experiments have proven that this may be a slightly greater distance than the average driver will require for safe passing purposes, but inasmuch as the object of the invention is safety, the added margin functions to err on the side of safety, a condition that cannot be faulted. Accordingly, once an overtaking vehicle gets within two or two and one half car lengths from the vehicle upon which the safety mirror is mounted, portions of the overtaking vehicle will appear in the red or "danger" area when viewed by the driver, thereby quickly allowing the driver to determine not to attempt to pass a forwardly positioned, slower moving vehicle.

It should be noted that the colored plastic laminate, including both the red color and the yellow color, additionally functions during the evening hours to mute any glare that may result from the reflection of automobile headlamps of an overtaking vehicle as that vehicle is observed by the driver in the improved safety mirror.

In order to assure proper angularity when positioning the improved safety mirror and to readily standardize installation and operation procedures, the improved safety mirror of the present invention is provided with guide markings positioned in the "caution" zone to aid in initially orienting and adjusting the side view mirror prior to driving. The guide markings include horizontal and vertical lines which function to enable the improved safety mirror to be safely and accurately employed when used upon substantially all vehicles by drivers of widely varying configurations and sizes.

It is intended that the guide markings and the demarcation line will define a safety area or "sight" therebetween so that the driver can readily determine when an overtaking vehicle is at a safe distance behind him. In use, the vertical portion of the guide marking is aligned with the left extent of the left rear quarter panel as viewed from the driver's seat. Then the horizontal portion of the guide marking can be aligned with the top of the left rear quarter panel as viewed from the driver's seat to thereby adjust the safety mirror both for horizontal angularity and vertical angularity to facilitate optimum observation in a controlled manner of any rearwardly positioned vehicle.

The location of an image on the left side view mirror depends on:

a. the location of the object relative to the mirror b. the location of the driver's eye relative to the mirror c. the orientation of the mirror To simplify the mathematics as much as possible, a point on the mirror surface has been selected as a fixed reference and will be referred to as the "origin" from here on. The origin is a point on the right edge of the mirror centered between the top and bottom edges. The location of the driver's eye and also the location of the object vehicle will be referenced to this point using the indicated cartesian coordinate system where:

X is the horizontal axis perpendicular to the left side of the vehicle

Y is the horizontal axis running parallel to the left side of the vehicle

Z is the vertical axis relative to the vehicle

The distance and direction of the driver's eye from the origin is described by the X, Y and Z components which are designated DX, DY and DZ respectively. The magnitude of the distance is therefore:

$$D = \sqrt{DX^2 + DY^2 + DZ^2}$$

The X, Y and Z components used to describe the location of the object vehicle are designated XI, YI and ZI, respectively. The location of the driver and the location of the object vehicle are now described in relation to the origin.

To use the side view mirror properly, a driver must orient the mirror according to his normal position in the vehicle. It is assumed that proper orientation is achieved when the driver is able to view straight along the Y axis (along the left side of his vehicle) when looking at the point on the mirror referred to as the origin. The direction of the driver may be described by the angles $\phi_1$ and $\theta_1$ where:

$\phi_1$ = arctan DY/DX $\theta_1$ = arccos DZ/D

To determine the angle a properly adjusted mirror will make with the X axis, it is necessary to view the horizontal X-Y plane. The angle $\phi_1$ is known and the angle between the driver and the Y axis is therefore 90 degrees $-\phi_1$. Because the driver views the Y-axis when looking at the origin and also because the incidence angle ($\phi_2$) must equal the reflectance angle ($\phi_1 + \phi_3$), the line normal or perpendicular to the mirror surface divides angle (90 degrees $-\phi_1$) in half. Therefore, the angle between the mirror and the left side of the vehicle is:

$$\phi_2 = \left[ 90° - \left( \frac{90° - \phi_1}{2} \right) \right] = \frac{90° + \phi_1}{2}$$

and the angle between the mirror and the X axis is $$\phi_3 = 90° - \phi_2$$

The angle $\phi_3$ represents the horizontal angle between the mirror and the X-axis.

The following illustrates the method for calculating the mirror angle relative to the vertical Z axis. The Y-Z plane represents the view of the vehicle's left side. The angle $\theta_1$ is known from a previous calculation. The angles $\theta_2$ and $\theta_3$ are calculated in the same manner as the horizontal angles $\phi_2$ and $\phi_3$. The angle between the mirror and axis is $$\theta_2 = \frac{90° + \theta_1}{2}$$

and the angle between the mirror and vertical Z axis is $$\theta_3 = 90° - \theta_2$$

The angles $\phi_2$ and $\theta_2$ describe the mirror orientation relative to the Y axis or left side of the car. The angles used to describe the orientation of the mirror for the following coordinate transformation are $\phi_3$ and $\theta_3$.

The straight line extension of the light rays reflected from the object vehicle to the driver's eye would converge upon the virtual image point. The only difference between viewing the object from the virtual image point and through the reflection to the driver's eye is that the image seen by the driver is inverted (mirror image). The virtual image point is behind the mirror at a distance equal to the distance of the driver's eye ahead of the mirror. The location of the virtual image point depends upon the position of the driver and mirror orientation.

Suppose a straight line is drawn between the object vehicle and the virtual image point. The intersection between this line and the mirror surface would be the location of the image on the mirror as seen by the driver. This location can be described by determining its cartesian coordinates relative to the origin. To simplify these coordinates and the associated equations, the original cartesian coordinate system must be rotated about the origin such that the mirror surface corresponds to the X-Z plane. To accomplish this transformation, the system is rotated about the Z axis by angle $\phi_3$, then rotated about the X' axis by angle $\theta_3$. The equations for the new X'', Y'' and Z'' coordinates are derived in terms of the original coordinates. For rotation about the Z axis:

$$X' = X \cos \phi_3 + Y \sin \phi_3$$

$$Y' = -X \sin \phi_3 + Y \cos \phi_3$$

$$Z' = Z$$

For rotation about the X' axis:

$$X'' = X'$$

$$Y'' = -Y' \cos \theta_3 + Z' \sin \theta_3$$

$$Z'' = -Y' \sin \theta_3 + Z' \cos \theta_3$$

Substituting the equations for X', Y' and Z' into the above equations and simplifying yields:

$$X'' = X \cos \phi_3 + Y \sin \phi_3$$

$$Y'' = -X \sin \phi_3 \cos \theta_3 + Y \cos \phi_3 \sin \theta_3 + Z \sin \theta_3 -$$

$$Z'' = -X \sin \phi_3 \sin \theta_3 - Y \cos \phi_3 \sin \theta_3 + Z \cos \theta_3 -$$

The X, Y and Z coordinates of both the driver's eye and the object vehicle are transformed to this new coordinate system. After the coordinate transformation, the original cartesian coordinates for the driver's position (DX, DY, DZ) become (DXC, DYC, DZC). Similarly, the original object vehicle coordinates (XI, YI, ZI) become (XC, YC, ZC). The position of the virtual image point is dependent upon the position of the driver. The coordinates of the virtual image point (VXC, VYC, VZC) are related as follows:

VXC = DXC

VYC = -DYC

VZC = DZC

The new cartesian coordinate system is now oriented so that the mirror lies in the X-Z plane.

The equation for a straight line between the virtual image point and object vehicle is $$\frac{X - VXC}{XC - VXC} = \frac{Y - VYC}{YC - VYC} = \frac{Z - VZC}{ZC - VZC}$$

X, Y and Z are the coordinates of any point on the line. Because the mirror lies completely on the X-Z plane, the value of Y is zero at the point of intersection between the line and the mirror. The equation for the straight line reduces to:

$$\frac{X - VXC}{XC - VXC} = \frac{VYC}{YC - VYC} = \frac{Z - VZC}{ZC - VZC}$$

solving for the values of X and Z:

$$X = -VYC \left( \frac{XC - VZC}{YC - VYC} \right) + VXC$$

$$Z = -VYC \left( \frac{ZC - VZC}{YC - VYC} \right) + VZC$$

The values X and Z from the above equations represent the location of coordinates of the image on the surface of the mirror as seen by the driver.

It is therefore an object of the present invention to provide an improved safety mirror of the type set forth.

It is another object of the present invention to provide an improved safety mirror fabricated of safety glass construction which includes a laminated sandwich comprising a front glass panel, a rear glass panel, and a colored plastic layer between the front and rear panels, the colored plastic layer comprising a yellow, "caution" area closest to the driver and a red, "unsafe" area further from the driver, the red and the yellow areas being defined one from the other by a line of demarcation for safety zone indication purposes.

It is another object of the present invention to provide an improved safety mirror having a yellow, "caution" area closest to the driver, a red, "unsafe" area furthest from the driver, a line of demarcation defining the "unsafe" area from the "caution" area and a guide line spaced from the line of demarcation to both define a safe passing sight therebetween and also to provide an easy method of orienting the improved safety mirror as to horizontal and vertical angularity to accommodate the needs of a driver of substantially any height.

It is another object of the present invention to provide an improved vehicle safety mirror that is inexpensive in manufacture, readily understandable when in use, and extremely simple in construction.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is an schematic view showing a vehicle equipped with the safety mirror of the present invention proceeding along a section of highway.

FIG. 2 is an enlarged, front elevational view of the present invention, partially broken away to disclose interior construction details.

FIG. 3 is an enlarged, partial, cross sectional view taken along line 3—3 on FIG. 2, looking in the direction of the arrows.

FIG. 4 is an elevational view similar to FIG. 2, showing a modified demarcation line between the safe and non-safe passing zones.

DESCRIPTION OF THE PREFERRED EMBODIMENT OF THE INVENTION

Figure 5:
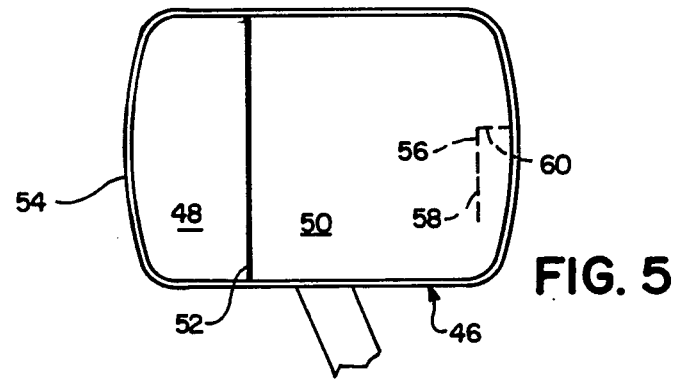
FIG. 5 is an enlarged, front elevational view of a modified safety mirror.

Although specific terms are used in the following description for the sake of clarity, these terms are intended to refer only to the particular structure of the invention selected for illustration in the drawings, and are not intended to define or limit the scope of the invention.

Referring now to the drawings, in FIG. 1, a motor vehicle 12 is illustrated schematically travelling along a highway 14 of the two lane type, having a right or driving lane 16 and an opposite or passing lane 18. In the usual manner, should the driver of the vehicle 12 wish to pass a forwardly positioned vehicle (not illustrated), after determining that there was no on-coming traffic and that there was sufficient clearance between the vehicle 12 and any overtaking vehicle (not shown), the driver could then pull his vehicle into the passing lane or left lane 18 to quickly and efficiently pass the slower moving vehicle in front. As illustrated, the vehicle 12 is equipped with a vehicle safety mirror which is affixed to the automobile as a side mount mirror 10 on the driver's side.

Referring now to FIGS. 2 and 3, it will be seen that the side mount mirror 10 is conventionally rectangular (or other shape) in configuration and includes a metallic frame 20 of suitable construction to securely affix to the vehicle 12 in well known manner. The side mount mirror of the present invention is fabricated of safety glass and includes a laminated or sandwich-like construction comprising a front or top glass panel 22, a rear or bottom glass panel 24 and a plastic layer 26 laminated therebetween. A silver or other suitable mirror surface 28 is applied rearwardly to the bottom glass panel 24 in known manner to provide a reflecting construction.

As best seen in FIG. 2, the laminated plastic layer 26 is subdivided into a yellow plastic layer 36 and a red plastic layer 38. A safety demarcation line 30 is defined between the yellow layer 36 and the red layer 38. Accordingly, when a overtaking vehicle is seen by the driver to be to the right of the demarcation line 30, the image of the oncoming vehicle will be viewed in the yellow or "pass with caution" zone 32. Similarly, when the trailing vehicle is so close as to have a portion of its image viewed by the driver (not shown) in the red or non-safe zone 34, the driver can then quickly ascertain that is not safe for him to enter the left lane 18 for passing purposes.

While the demarcation line 30 has been illustrated as a straight line, it will be appreciated that an oncoming vehicle is not entirely regular in configuration and portions of such a vehicle may extend over a staight demarcation line 30 even though the trailing vehicle is at a safe distance behind. Accordingly, the demarcation line 40 (and the underlying laminated plastic layer) may be configured to other than a straight line separation to accommodate such vehicle irregularities as the roof, wheels, hood, etc.

While the shaped or curved demarcation line 40 of FIG. 4 may be more accurate than the straight demarcation line of FIG. 2, it will be appreciated that the viewing and consequently the speed of determination of caution and non-safe conditions can be more readily made in the configuration of FIG. 2 rather than the configuration of FIG. 4. Accordingly, many drivers may prefer to lose a little in the way of accuracy in order to make up this loss by the speed and ease of determination.

In using the mirror 10 of FIG. 2, the driver (not shown) simply looks through the side view mirror 10 to determine the position of the image of overtaking traffic. If an overtaking vehicle appears in the caution zone 32 entirely to the right of the demarcation line 30, he knows that is nominally safe for him to enter the passing lane. In the event any part of the image of the overtaking vehicle appears to the driver on the red or non-safe zone 34 to the left of the demarcation line 30, then the driver will know that it is not safe to enter the passing lane 18 because the oncoming vehicle is less than two or two and one half lengths behind and therefore too close for safety purposes.

In utilizing the vehicle safety mirror 10' of FIG. 4, the driver will view the image of oncoming traffic in the mirror and determine the position of an overtaking vehicle. If the entire portion of the overtaking vehicle appears within the caution zone 42, that is the yellow zone, then the driver knows at a glance that is at least nominally safe for him to enter the passing lane 18 for passing a vehicle in front of him. However, if a major portion of an overtaking vehicle appears in the red or non-safe passing zone 44, he will then know not to enter the lane 18 and this determination can be made very quickly and accurately. If the major portion of the overtaking vehicle appears in the caution zone 42 and only the roof or wheels appear in the non-safe zone 44, then the driver will be able to determine with somewhat greater accuracy that is clear for him to pass the vehicle in front of him with adequate safety.

Referring now to FIG. 5, there is illustrated a modified safety mirror 46 that is fabricated similar to the safety mirror of FIG. 2 and includes generally a red or "unsafe" indicating area 48, a yellow or "caution" indicating area 50 and a line of demarcation 52 therebetween. A frame 54 is provided in usual manner to mount the colored indicating areas 48, 50 and to affix the device 46 to a fixed portion of the automobile or other vehicle 12.

To provide uniformity in aligning and aiming the improved safety mirror 46, an L-shaped guide 56 is formed in the caution area 50. The guide 56 is spaced from the line of demarcation and preferably is positioned near the lower right corner of the frame 54 in a location nearest to the vehicle 12 to which the safety mirror 46 is attached.

The guide 56 comprises a vertical guide line 58 and a horizontal guide line 60. The horizontal guide line intersecting the vertical guide at its upper terminus at right angles. In use, in order to properly align the safety mirror 46, the frame 54 is moved until the vertical plane defining the left extent of the left rear quarter panel of the vehicle 12 aligns with the vertical guide line 58 and the top of the left rear quarter panel aligns with the horizontal guide line 60. In this manner, the safety mirror 46 can be quickly adjusted as to lateral and vertical angularity to facilitate similar rearward viewing by any driver, regardless of his size.

Figure 6:
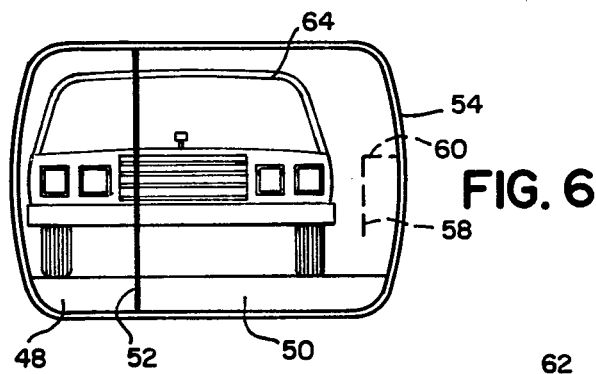
FIG. 6 is a front elevational view of the safety mirror of FIG. 5, showing a portion of the image of a trailing vehicle in the "unsafe" passing area.
Figure 7:
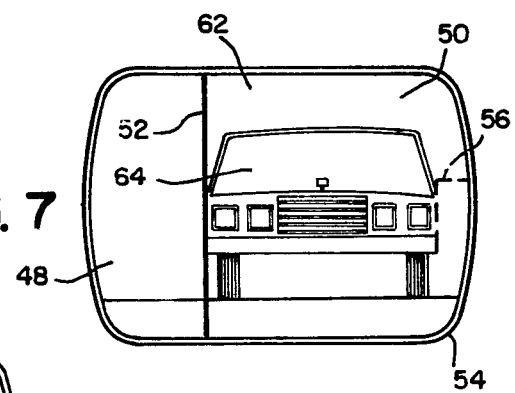
FIG. 7 is a front elevational of the safety mirror similar to FIG. 6 showing the image of a trailing vehicle entirely within the "caution" area to indicate a marginally safe lane changing condition.
Figure 8:
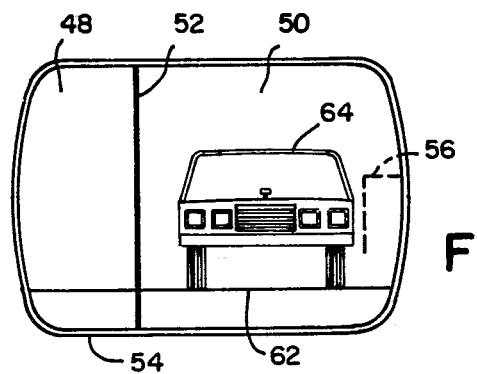
FIG. 8 is a view similar to FIG. 7 showing the image of a trailing vehicle entirely within the "caution" area to indicate more clearly a safe lane changing condition.

In use, as best seen in FIGS. 7 and 8, the demarcation line 52 and the sight guide 56 define a safety area or "sight" 62 therebetween whereby, when the driver observes a trailing automobile 64 in the "sight" area 62, he can immediately determine that it is apparently safe to change lanes for passing, depending of course, upon other road conditions. The image of a trailing automobile 64, as viewed in FIG. 6, indicates clearly an unsafe lane changing situation. When the image of the trailing automobile 64 appears as in FIG. 7, in view of the proximity of the image to the demarcation line 52, with all of the image displayed in the caution area 50, the driver will know that a marginally safe lane changing condition exists. The arrangement of FIG. 8 indicates clearly that a safe lane changing condition exists.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A side mount safety mirror for lateral and vertical adjustable mounting on the left side of a vehicle wherein the vehicle includes a left rear quarter panel, the left cover panel having a left marginal edge and a top marginal edge, comprising
   a frame;
   a right, first colored area secured in the frame and being positioned closest to the left side of the vehicle;
   a left, second colored area secured in the frame, the first colored area being interposed between the vehicle and the second colored area;
   a line of demarcation between the first colored area and the second colored area, the first colored area being larger in width than the second colored area, the line of demarcation being arranged in vertical orientation; and
   a guide positioned in the first colored area in spaced relation from the line of demarcation,
   the guide comprising a vertical guide line, the vertical guide line and the line of demarcation defining a trailing vehicle sight area therebetween,
   the vertical guide line being in alignment with the left marginal edge of the left rear quarter panel to indicate proper lateral mirror orientation when the mirror is in use.

2. The safety mirror of claim 1 wherein the guide comprises a horizontal guide line, the horizontal guide line intersecting the vertical guide line, the said horizontal guide line being in alignment with the top marginal edge of the left rear quarter panel to indicate proper vertical mirror orientation when the mirror is in use.

3. The safety mirror of claim 2 wherein the intersection between the horizontal guide line and the vertical guide line is at right angles.

4. The safety mirror of claim 3 wherein the first colored area is yellow.

5. The safety mirror of claim 4 wherein the second colored area is red.

6. The safety mirror of claim 3 wherein the guide is inverted L-shape in configuration.

7. The safety mirror of claim 3 wherein the frame comprises a right side and wherein the guide is positioned closer to the right side of the frame than it is to the said line of demarcation.

8. The safety mirror of claim 3 wherein the frame is generally rectangular in configuration and comprises a lower right corner, the guide being positioned immediately adjacent to the said lower right corner.

* * * * *